(12) United States Patent
Nolten et al.

(10) Patent No.: US 11,317,635 B2
(45) Date of Patent: May 3, 2022

(54) TREATMENT DEVICE AND METHODS FOR PREPARING A POULTRY CARCASS FOR HARVESTING

(71) Applicant: Meyn Food Processing Technology B.V., Oostzaan (NL)

(72) Inventors: Eric Nolten, Cumming, GA (US); Daniel Edward Barbee, Gillsville, GA (US); Hynek Kocourek, Kennesaw, GA (US)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 17/023,684

(22) Filed: Sep. 17, 2020

(65) Prior Publication Data
US 2022/0079175 A1    Mar. 17, 2022

(51) Int. Cl.
*A22C 21/00* (2006.01)
(52) U.S. Cl.
CPC ...... *A22C 21/0069* (2013.01); *A22C 21/0046* (2013.01); *A22C 21/0053* (2013.01)
(58) Field of Classification Search
CPC . A22C 21/00; A22C 21/0069; A22C 21/0053; A22C 21/0046

USPC .......... 452/135, 136, 149–153, 160
See application file for complete search history.

(56) References Cited

U.S. PATENT DOCUMENTS

| | | | | |
|---|---|---|---|---|
| 4,564,976 A | * | 1/1986 | Beech | A22C 21/0023 452/149 |
| 5,154,664 A | * | 10/1992 | Hazenbroek | A22C 21/0023 452/117 |
| 8,435,100 B2 | * | 5/2013 | De Vos | A22C 21/0069 452/136 |
| 8,974,271 B2 | | 3/2015 | DeVos et al. | |
| 2011/0045756 A1 | * | 2/2011 | De Vos | A22C 21/0069 452/136 |
| 2018/0020684 A1 | * | 1/2018 | De Vos | A22C 21/0023 452/136 |

* cited by examiner

*Primary Examiner* — Richard T Price, Jr.
(74) *Attorney, Agent, or Firm* — Dority & Manning, P.A.

(57) ABSTRACT

A treatment device or method for preparing a poultry carcass, as provided herein, may serve to remove a portion of the carcass's keel bone on a conveyor line. The treatment device may include a blade carriage and bone blade. The blade carriage may be disposed at a preharvest station on a conveyor path of the conveyor line. The bone blade may be mechanically linked to the blade carriage at the preharvest station to remove a tip of the keel bone. The bone blade may be aligned with the keel bone between a pair of fillets of the carcass within the preharvest station. The bone blade may also be spaced apart from a sternum of the carcass.

20 Claims, 7 Drawing Sheets

US 11,317,635 B2

TREATMENT DEVICE AND METHODS FOR PREPARING A POULTRY CARCASS FOR HARVESTING

FIELD OF THE INVENTION

The present subject matter relates generally to harvesting a poultry carcass for fillets, and more particularly to devices and methods for treating a poultry carcass prior to fillet harvesting.

BACKGROUND OF THE INVENTION

Systems and methods for harvesting fillets from poultry (e.g., chicken) carcasses are generally known. For instance, existing systems can accommodate multiple carcasses on a conveyor line that can move the carcasses to a device that peels or otherwise separates poultry breasts (i.e., fillets) from the rest of a carcass. The peeled fillets often form what is known as a "butterfly" from two joined breast fillets.

Although existing systems can effectively separate fillets from the rest of a carcass, certain drawbacks exist. For instance, it is possible for such systems to break the fragile tip of a poultry carcass's keel bone while peeling the fillets. This may cause the broken tip to embed within one of the fillets. To ensure customer satisfaction, though, the broken tip must be removed. Often, this removal is done manually and can be difficult. Moreover, it can significantly slow the overall harvesting process and hamper efficiency. If not done carefully, removal of a broken tip can generate a visually unappealing or relatively small fillet (e.g., due to the excessive removal of meat).

As a result, it would be desirable to provide a device or method addressing one or more of the above issues. For instance, it would be useful for a device or method to prevent portions of a carcass's keel bone from embedding within a fillet, or otherwise reduce the potential for a keel bone segment to stick to a harvested fillet. Additionally or alternatively, it would be advantageous for a device or method to reduce the need for manual removal of a keel bone segment from a fillet prior to or subsequent to harvesting the fillet from a carcass. Moreover, it may be especially advantageous for system or methods to remove portions of a keel bone without significantly reducing the usable mass or quality of harvested fillets.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a treatment device is provided. The treatment device may include a blade carriage and a bone blade. The blade carriage may be disposed at a preharvest station on a conveyor path defined along a transport direction by a conveyor line. The bone blade may be mechanically linked to the blade carriage at the preharvest station to remove a tip of the keel bone. The bone blade may be aligned with the keel bone between a pair of fillets of the poultry carcass within the preharvest station. The bone blade may further be spaced apart from a sternum of the poultry carcass.

In another exemplary aspect of the present disclosure, a method of treating a poultry carcass on a conveyor line is provided. The method may include transporting the poultry carcass through a preharvest station on the conveyor path and detecting the poultry carcass in a treatment position along the conveyor path within the preharvest station. The method may further include directing a bone blade along to a contact position. The contact position may provide the bone blade in engagement with a tip of the keel bone and spaced apart from a sternum of the poultry carcass. The method may still further include removing the tip of the keel bone at the bone blade while in the contact position spaced apart from the sternum.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
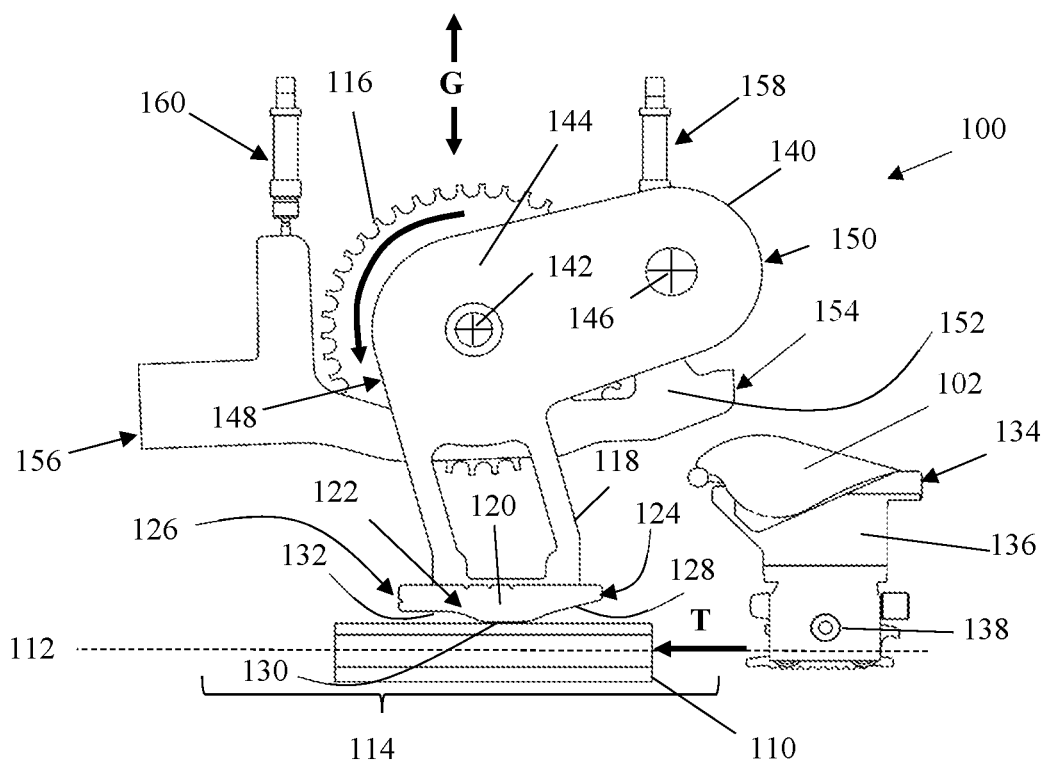
FIG. 1 provides a schematic perspective view of a treatment device according to exemplary embodiments of the present disclosure, wherein a portion thereof is unengaged prior to a poultry carcass entering the treatment device.
Figure 2:
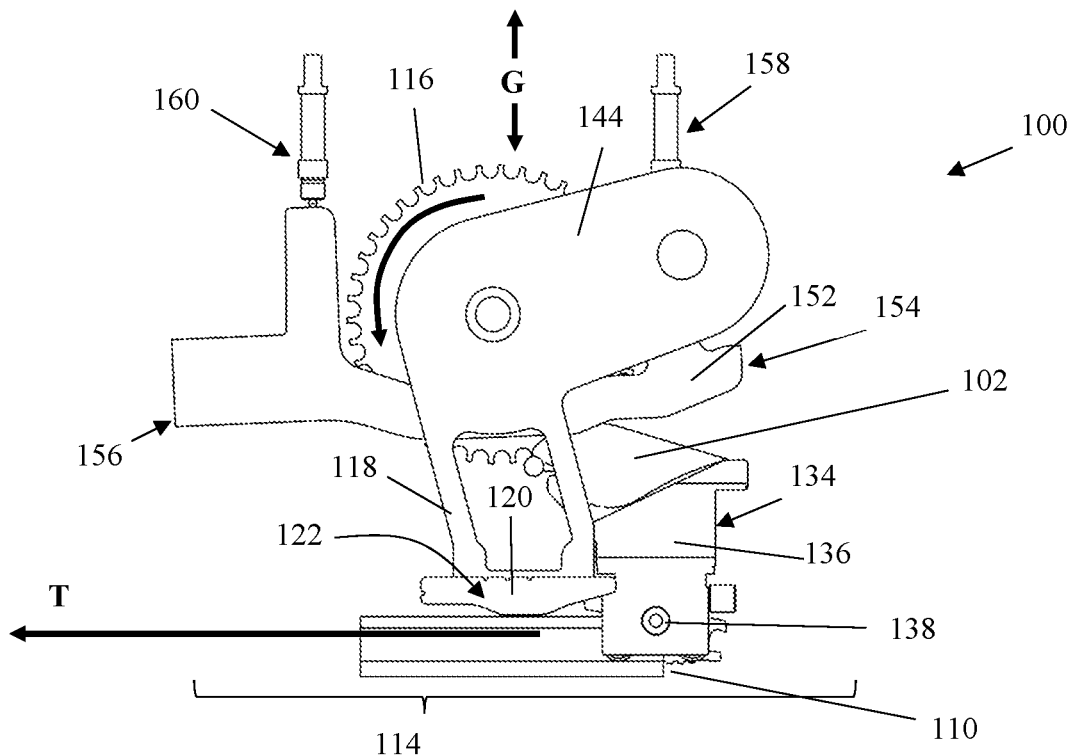
FIG. 2 provides a schematic, lateral perspective view of the exemplary treatment device of FIG. 1, wherein a portion thereof is engaged as the poultry carcass is transported through the treatment device.
Figure 3:
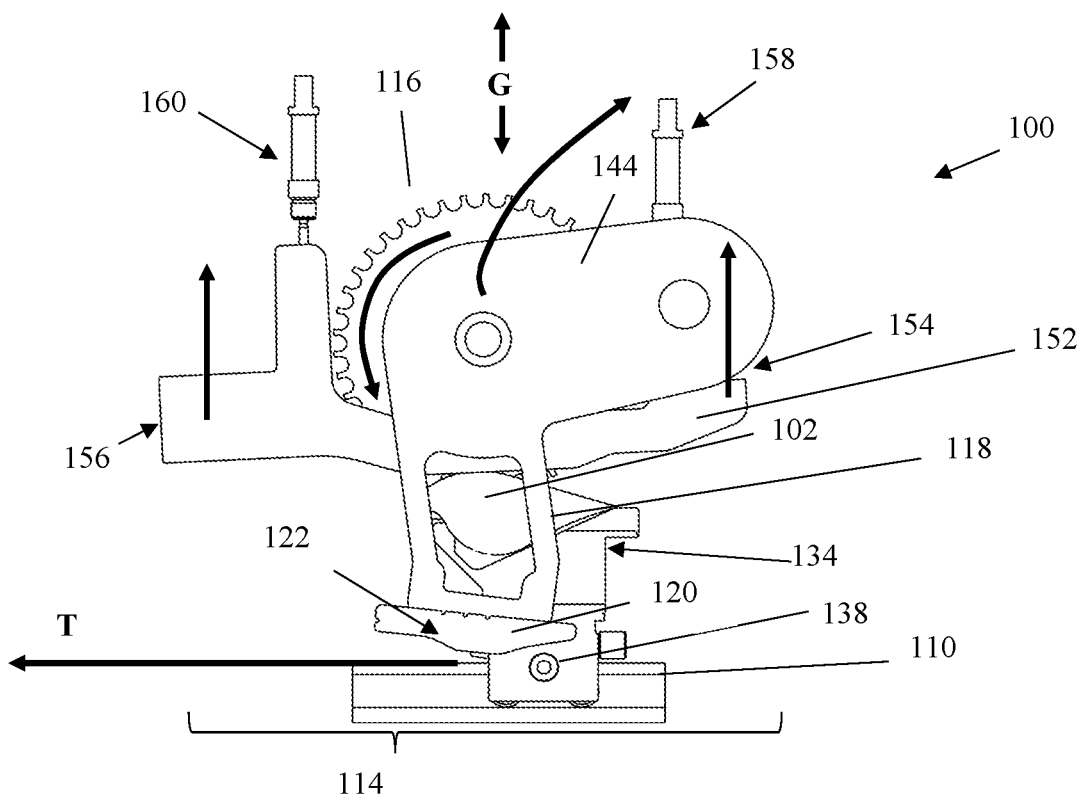
FIG. 3 provides a schematic, lateral perspective view of the exemplary treatment device of FIG. 1, wherein a portion thereof is engaged as the poultry carcass is transported further through the treatment device.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, the term "or" is generally intended to be inclusive (i.e., "A or B" is intended to mean "A or B or both").

Turning now to the figures, FIGS. 1 through 4 and 14 generally illustrate a treatment device 100 for removing a segment of a keel bone 104 (FIG. 5) of a poultry carcass 102. Specifically, the poultry carcass 102 is transported on a conveyor line 110 defining a conveyor path 112 along a transport direction T, which is perpendicular to a lateral direction L. When assembled, the conveyor line 110 may be mounted upstream (i.e., rearward relative to the conveyor path 112) from or as a part of a harvesting device, which can separate (e.g., peel) one or both fillets 106 from the poultry carcass 102, as is understood.

In some embodiments, a blade carriage 118 supporting or otherwise mechanically linked to a bone blade 116 is provided at a preharvest station 114. The preharvest station 114 may be generally defined at or by treatment device 100 on the conveyor path 112. Thus, a poultry carcass 102 (e.g., a single carcass or a series of sequential carcasses) may be transported along conveyor line 110 through preharvest station 114. As will be described in detail below, blade carriage 118 and bone blade 116 may move together along a guide direction G (e.g., perpendicular to the transport direction T, lateral direction L, or conveyor line path 112) to remove a segment of a keel bone 104 of the poultry carcass 102 as the poultry carcass 102 is moved along the transport direction T.

Generally, blade carriage 118 may move (e.g., inward toward conveyor line 110 or outward away from conveyor line 110) along the guide direction G according to a position of the poultry carcass 102 as it is transported through the preharvest station 114. In some embodiments, blade carriage 118 includes a cam 120 to engage the poultry carcass 102 (e.g., directly or indirectly, such as through a carrier car 134 supporting the carcass 102). As shown, cam 120 may be laterally spaced apart from the conveyor path 112. In particular, cam 120 is offset from a centerline of the poultry carcass 102, which is where the keel bone 104 is generally located. Thus, cam 120 may be laterally spaced apart from keel bone 104 and, optionally, one or both fillets 106 of the poultry carcass 102.

In certain embodiments, cam 120 defines a curved profile 122. The curved profile 122 of cam 120 may extend along the transport direction T between a front edge 124 and a rear edge 126, while curving or undulating relative to the guide direction G to control the position or movement of blade carriage 118 along the guide direction G. In the illustrated embodiments, the curved profile 122 includes a relatively low entry segment 128 that leads along the transport direction T from front edge 124 to a relatively high intermediate peak 130, which is itself followed by a relatively low exit segment 132 extending to rear edge 126.

Optionally, a carrier car 134 may be included to facilitate or otherwise aid in transporting poultry carcass 102 along conveyor path 112. For instance, carrier car 134 may include a frame 136 on which one or more poultry carcasses 102 can be selectively (e.g., temporarily) supported. As an example, one or more prongs, clamps, or other mechanical fasteners may selectively hold poultry carcass 102 in a predefined position on frame 136. Frame 136 may be movable along conveyor path 112. Thus, poultry carcass 102 may move with frame 136 as it motivated on conveyor line 110, as is generally understood.

In some embodiments, a roller wheel 138 is (e.g., rotatably or statically) fixed to frame 136. In turn, roller wheel 138 may move relative to conveyor line 110 or conveyor path 112 in tandem with frame 136 and poultry carcass 102. As shown, roller wheel 138 may be laterally offset from a platform of frame 136, which may define the surface on which poultry carcass 102 is supported. Additionally or alternatively, roller wheel 138 may be laterally aligned with cam 120. For instance, roller wheel 138 may be disposed in alignment with cam 120 along the lateral direction L and the transport direction T. As carrier car 134 moves along conveyor path 112 in the transport direction T, cam 120 may selectively engage roller wheel 138, and in turn motivate blade carriage 118 outward or inward along the guide direction G according to the position of roller wheel 138 along transport direction T.

Figure 5:
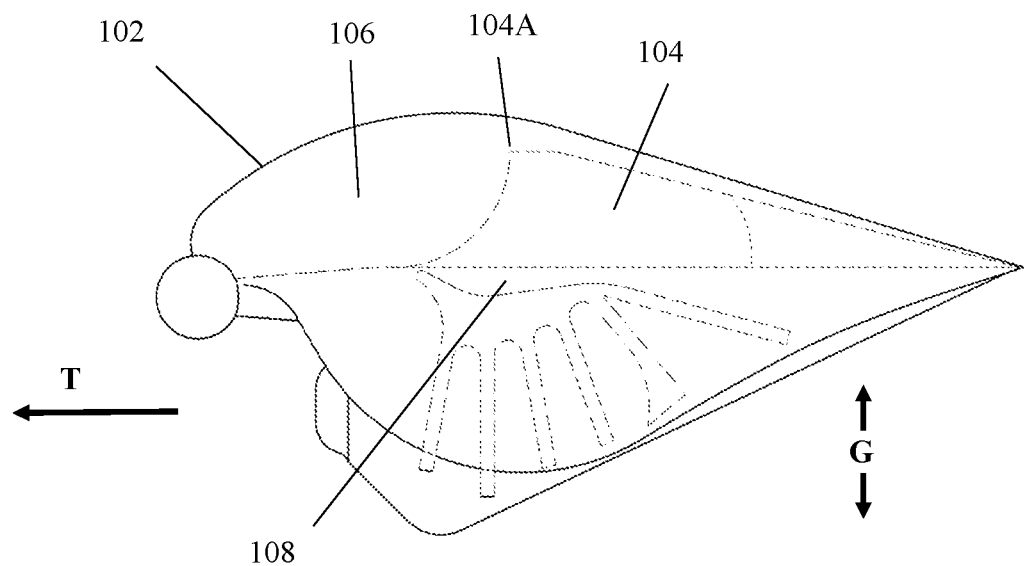
FIG. 5 provides a lateral perspective view of a portion of the poultry carcass prior to treatment through a treatment device.
Figure 6:
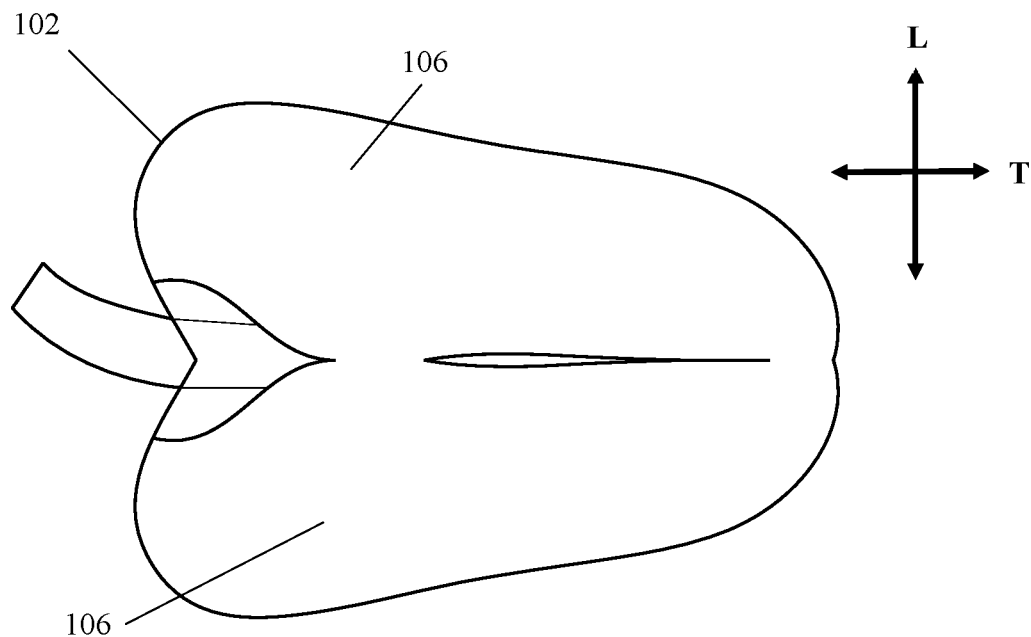
FIG. 6 provides a perspective view of the poultry carcass of FIG. 5 along a guide direction perpendicular to a transport direction.
Figure 7:
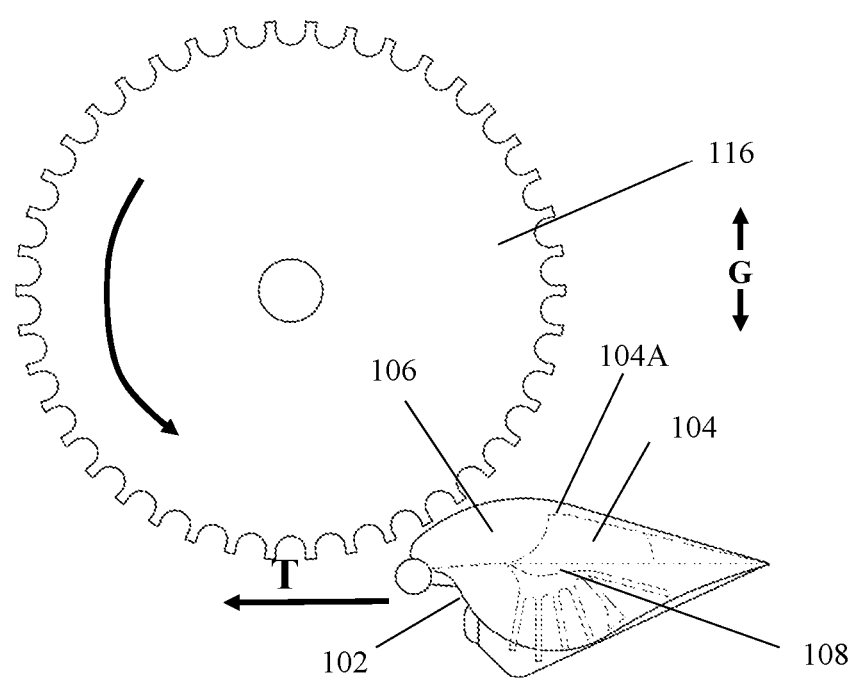
FIG. 7 provides a lateral perspective view of a bone blade and a portion of the poultry carcass as the bone blade begins to engage the poultry carcass.
Figure 8:
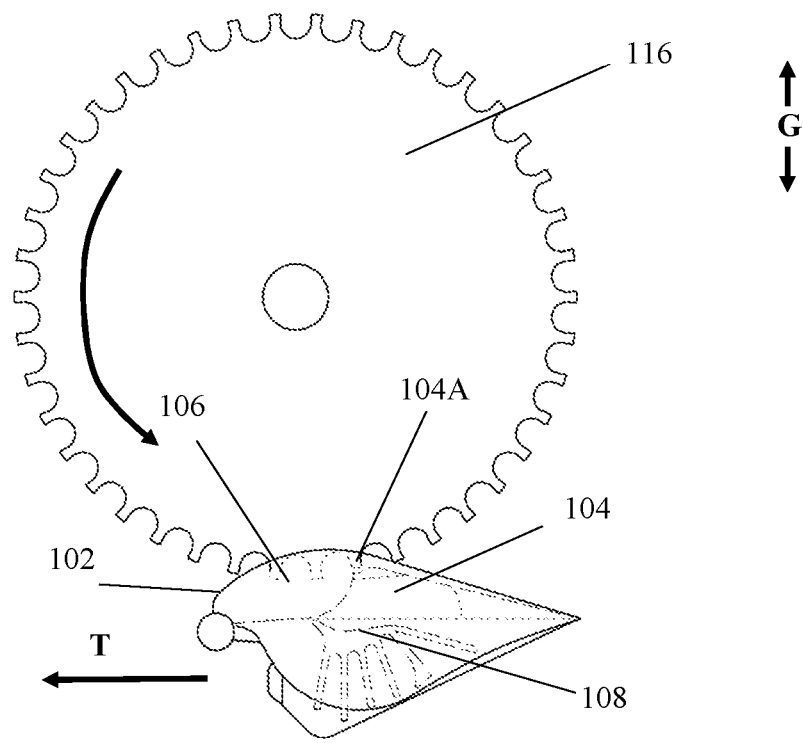
FIG. 8 provides a lateral perspective view of the bone blade and a portion of the poultry carcass as the bone blade continues to engage the poultry carcass.
Figure 9:
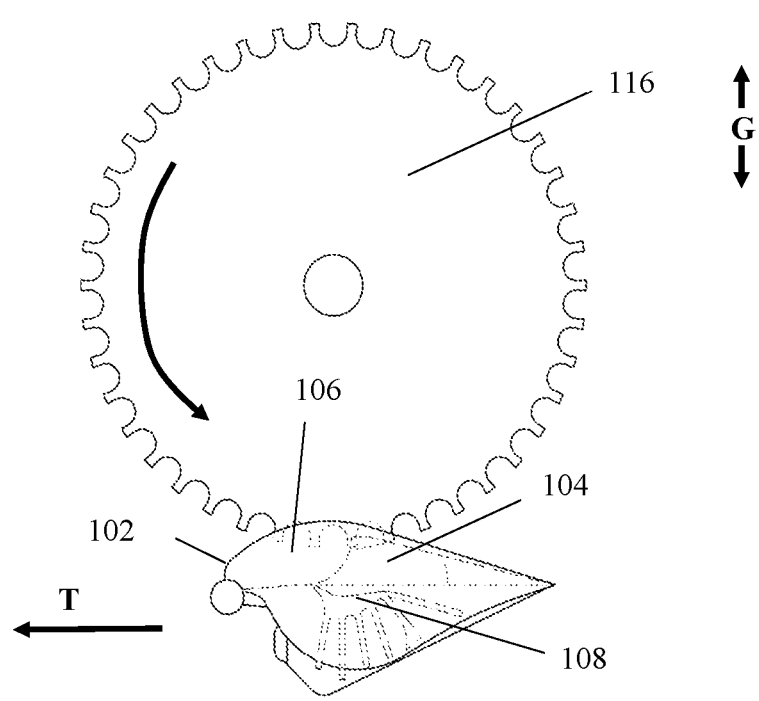
FIG. 9 provides a lateral perspective view of the bone blade and a portion of the poultry carcass as the bone blade removes a segment of the keel bone of the poultry carcass.
Figure 10:
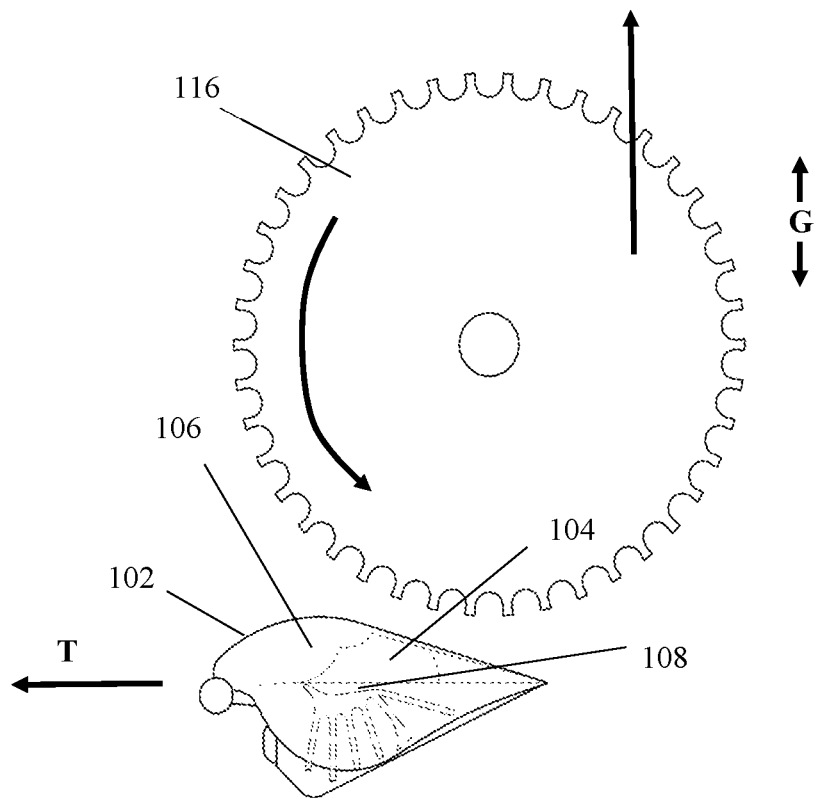
FIG. 10 provides a lateral perspective view of the bone blade and a portion of the poultry carcass after the bone blade has removed a segment of the keel bone of the poultry carcass.
Figure 11:
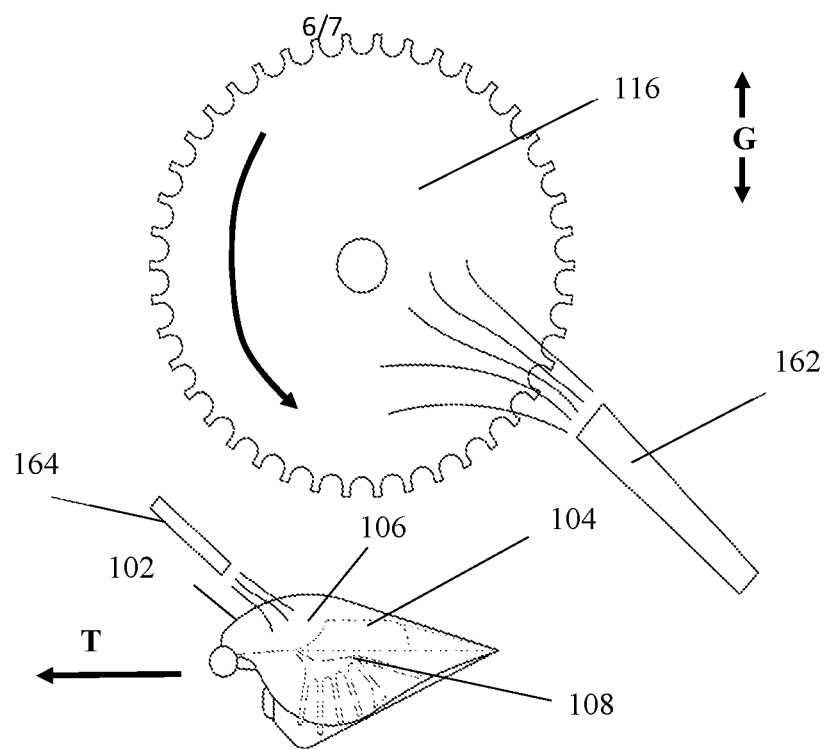
FIG. 11 provides a lateral perspective view of the bone blade and a portion of the poultry carcass after the bone blade has been moved out of engagement with the poultry carcass.
Figure 12:
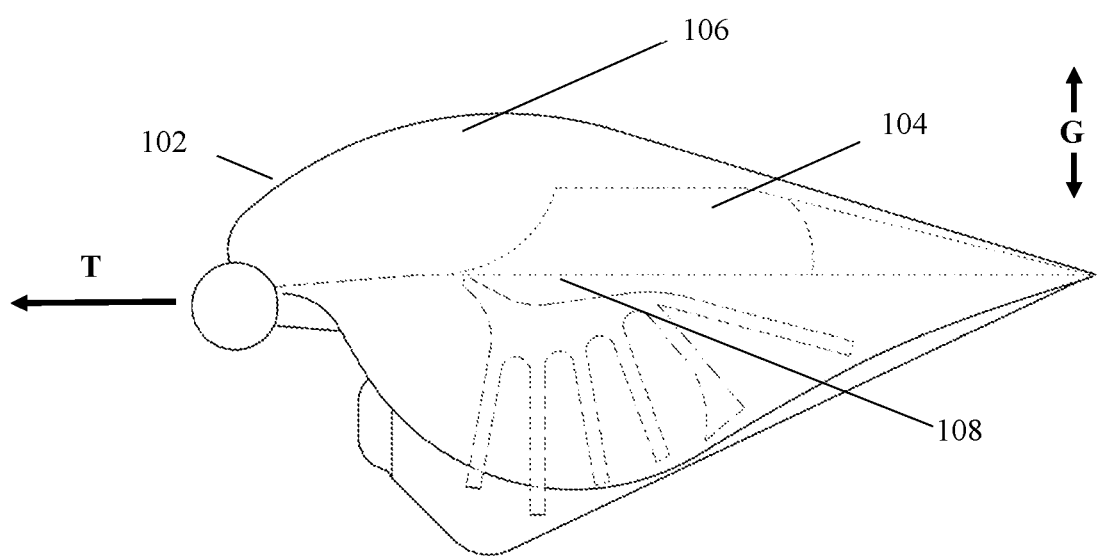
FIG. 12 provides a lateral perspective view of a portion of the poultry carcass subsequent to treatment through a treatment device.
Figure 13:
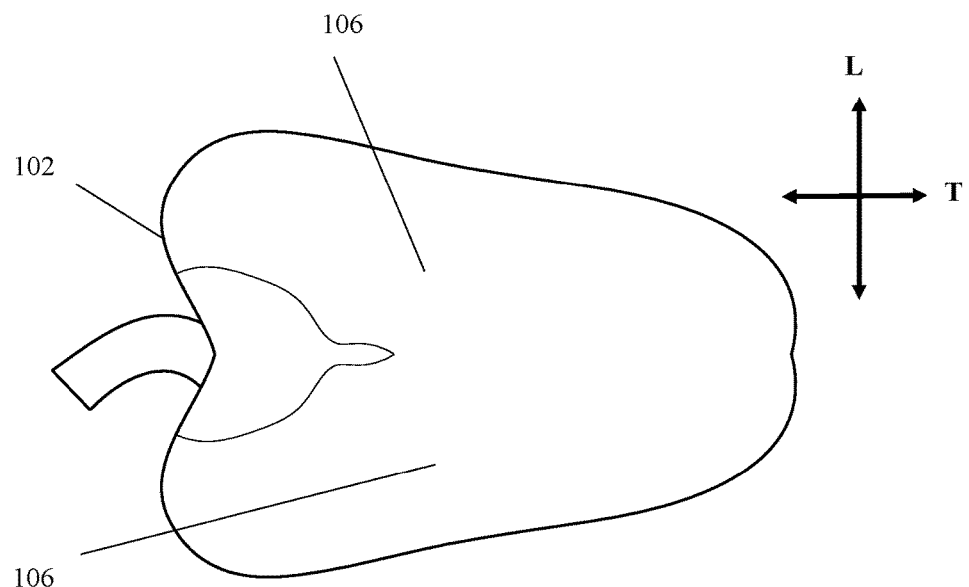
FIG. 13 provides a perspective view of the poultry carcass of FIG. 12 along the guide direction.
Figure 14:
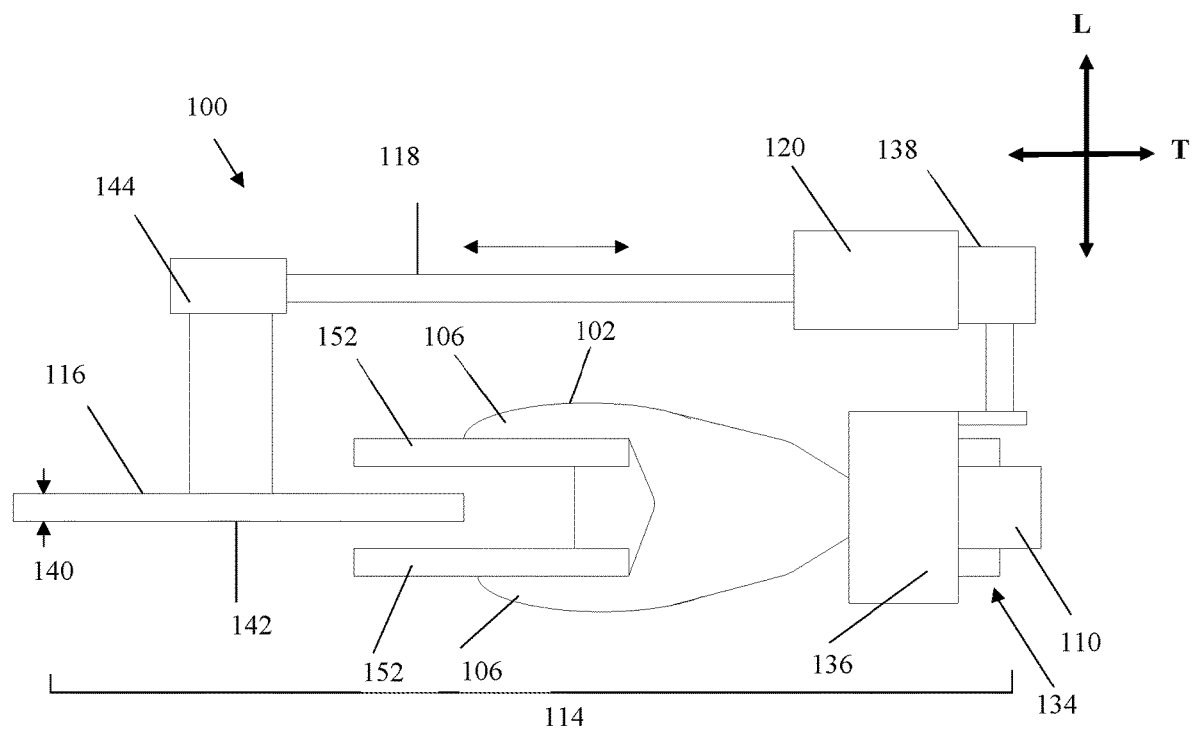
FIG. 14 provides a schematic perspective view of the exemplary treatment device of FIG. 1 along the guide direction.

Turning now generally to FIGS. 1 through 14, FIGS. 5, 6, 12, and 13 provide various views of poultry carcass 102 in isolation both prior to being transported through preharvest station 114 (FIGS. 5 and 6) and subsequent to being transported through preharvest station 114 (FIGS. 12 and 13). FIGS. 7 through 11 provide various views of poultry carcass 102 and bone blade 116 as poultry carcass 102 is being transported through preharvest station 114.

As noted above bone blade 116 is mechanically linked to blade carriage 118. Thus, as blade carriage 118 is moved along the guide direction G (e.g., according to engagement between cam 120 and roller wheel 138), bone blade 116 may also move along the guide direction G to perform a cutting or grinding action.

In some embodiments, bone blade 116 is aligned (e.g., along the lateral direction L) with the keel bone 104 within the preharvest station 114. In other words, bone blade 116 may be aligned to a predetermined region outward from conveyor path 112 or carrier car 134 (e.g., relative to the guide direction G) that the keel 104 will be transported through. For instance, if viewed along the transport direction T (i.e., such that the viewer's line of sight is parallel to the transport direction T) within preharvest station 114, bone blade 116 may be seen as lying on a common axis (e.g., parallel to the guide direction G) with keel bone 104.

As shown, bone blade 116 is disposed along the conveyor path 112 at the preharvest station 114. Moreover, bone blade 116 is spaced apart from at least a portion of conveyor line 110 along the guide direction G. Bone blade 116 may be further spaced apart (e.g., outward) from the carrier car 134 and at least a portion of poultry carcass 102 being transported through preharvest station 114. For instance, bone blade 116 may be spaced apart (e.g., relative to the guide direction G) from a sternum 108 of poultry carcass 102, which is generally disposed at a base of keel bone 104 opposite of the tip 104A. Movement of bone blade 116 along the guide direction G (e.g., inward toward conveyor line 110) may place bone blade 116 in the path of (or into engagement with) poultry carcass 102. Nonetheless, bone blade 116 may be held apart (e.g., outward from) the sternum 108, even when contacting or engaging poultry carcass 102, such as in the bone blade's 116 most inwardly disposed (e.g., contact) position. Thus, bone blade 116 may be prevented from completely separating poultry carcass 102 (or the pair of fillets 106) into two discrete, un-joined halves.

Generally, bone blade 116 may be provided as any suitable cutting or grinding member that can be selectively activated to move (e.g., rotate or oscillate as directed by a corresponding blade motor—not pictured) relative to blade carriage 118, poultry carcass 102, or conveyor path 112. Thus, activated movement (e.g., rotation or isolation) relative to blade carriage 118 may be permitted in tandem with or in addition to movement of bone blade 116 along the guide direction G. In exemplary embodiments, bone blade 116 defines a set blade width 140 (e.g., relative to the lateral direction L) at a leading edge of the bone blade 116. Blade width 140 may be relatively large in comparison to an expected width of the tip 104A of keel bone 104. In some embodiments, blade width 140 is greater than or equal to 3 millimeters. In additional or alternative embodiments, blade width 140 is greater than or equal to 6 millimeters. In further additional or alternative embodiments, blade width 140 is greater than or equal to 8 millimeters. In yet further additional or alternative embodiments, blade width 140 is less than or equal to 12 millimeters. In still further additional or alternative embodiments, blade width 140 is less than or equal to 10 millimeters.

In the illustrated embodiments, bone blade 116 includes a saw blade that is rotatable about a blade axis 142 (e.g., parallel to the lateral direction L). As shown, the saw blade may be rotatable against the transport direction T (e.g., in an outward, rearward, rotational direction). Thus, when saw blade is activated (e.g., as motivated by the corresponding blade motor), poultry carcass 102 may be transported into contact with an inner portion of the saw blade from which a result force or inertia path is generated opposite to the transport direction T. Optionally, the blade axis 142 may be disposed forward from high intermediate peak 130 or exit segment 132 relative to the transport direction T.

A pivot arm 144 of the blade carriage 118 may connect or join bone blade 116 to the rest of blade carriage 118 (e.g., including cam 120). As shown, pivot arm 144 may extend between a free end 148, which defines blade axis 142, to a fixed end 150. Pivot arm 144 may be pivotable about a pivot axis 146 (e.g., parallel to the lateral direction L or blade axis 142). For instance, pivot axis 146 may be defined at a fixed end 150 (e.g., rearward from high intermediate peak 130 or aligned with entry segment 128 relative to the transport direction T). Fixed end 150 may be joined to a static mounting structure (not shown). When assembled pivot axis 146 may be generally stationary relative to conveyor path 112 or the guide direction G, even as blade carriage 118 engages the poultry carcass 102 or carrier car 134 being transported through preharvest station 114. By contrast, free end 148 may pivot about the pivot axis 146 and thus move, at least in part, along the guide direction G.

Advantageously, blade carriage 118 may selectively move bone blade 116 along (and facilitate removal of) a segment of poultry carcass 102 (e.g., a tip 104A of the keel bone 104) without completely separating poultry carcass 102 or its pair of fillets 106. Moreover, bone blade 116 may be prevented from removing excessive mass or portions of fillet 106.

In some embodiments, one or more leader bars 152 are provided within the preharvest station 114 to engage or contact the poultry carcass 102 as it is being transported. As shown, a leader bar 152 may extend along (e.g., parallel to the transport direction T) between a front end 154 and a rear end 156. Generally, leader bar 152 may be laterally spaced apart from bone blade 116. In some embodiments, front end 154 is further positioned rearward from bone blade 116 or blade axis 142 relative to the transport direction T, while rear end 156 is further positioned forward from bone blade 116 or blade axis 142 relative to the transport direction T.

As shown, leader bar 152 may be supported between front end 154 and rear end 156 by a pair of a pair of biasing arms (e.g., a front biasing arm 158 and a rear biasing arm 160). The pair of biasing arms 158, 160 may include any suitable damping member (e.g., spring, pneumatic shock, hydraulic shock, etc.) and may be independent of each other to bias leader bar 152 along the guide direction G (e.g., inward toward conveyor line 110). When assembled, front biasing arm 158 may be mounted to leader bar 152 proximal to front end 154 (i.e., distal to rear end 156), and rear biasing arm 160 may be mounted to leader bar 152 proximal to rear end 156 (i.e., distal to front end 154). Thus, front biasing arm 158 may be disposed rearward from the bone blade 116 relative to the transport direction T, while rear biasing arm 160 may be disposed forward from the bone blade 116 relative to the transport direction T.

In certain embodiments, a pair of leader bars 152 are provided at opposite sides (e.g., lateral sides) of bone blade 116. The pair of leader bars 152 may be parallel to each other (e.g., relative to the lateral direction L or transport direction T) or may otherwise extend along equal lengths and common directions (e.g., as mirrored members across the guide direction G), as shown. Thus, each leader bar 152 may include a front end 154 disposed at a common location (i.e., common to both leader bars 152) relative to the transport direction T and a rear end 156 disposed at another common location relative to the transport direction T.

During use, such as when poultry carcass 102 is being transported through preharvest station 114, the leader bar(s) 152 may slidably contact a portion of the poultry carcass 102. For instance, each leader bar 152 may contact a fillet 106 to lift or hold a portion of the fillet 106 apart from bone blade 116. As shown, the pair of leader bars 152 may slidably contact joined fillets 106 of the poultry carcass 102 to stretch the fillets 106 laterally, advantageously preventing the fillets 106 from contacting bone blade 116.

In optional embodiments, one or more spray nozzles are provided within preharvest station 114 to selectively direct a fluid (e.g., air, compressed gas, water, etc.) to a portion of the preharvest station 114, advantageously dislodging or wash away remaining sediment (e.g., bone fragments) generated during use. As an example, a blade nozzle 162 may be selectively directed at the bone blade 116 (e.g., the bone blade 116 in the post-cut position) to motivate a fluid spray against the bone blade 116 apart from a treated poultry carcass 102. Blade nozzle 162 may, for instance, be disposed rearward or laterally apart from bone blade 116. As an additional or alternative example, a carcass nozzle 164 may be selectively directed at the poultry carcass 102 (e.g., a predetermined location on conveyor path 112 through which a treated carcass is transported), and specifically a portion of the keel bone 104 or sternum 108 to motivate a fluid spray against the poultry carcass 102 forward from the bone blade 116 along the transport direction T. Specifically, the fluid spray of carcass nozzle 164 may be directed at the remaining portion of keel bone 104 (e.g., after another portion or segment has been cut or ground off of carcass 102). Thus, the carcass nozzle 164 may spray the poultry carcass 102 following removal of at least a segment of keel bone 104.

Still referring generally to FIGS. 1 through 14, an exemplary method of operating a treatment device (e.g., treatment device)100 is described below. It is noted that the exemplary method is provided as an example only and does not otherwise limit further modification (e.g., addition/removal of steps or performing the method in the context of a different treatment device) within the scope of the present disclosure.

Generally, the exemplary method includes transporting the poultry carcass 102 through the preharvest station 114 on the conveyor path 112. For instance, as described above, a carrier car 134 may support the poultry carcass 102. Moreover, carrier car 134 may be slidably disposed on at least a portion of conveyor line 110. In turn, transporting the poultry carcass 102 may include sliding the carrier car 134 through preharvest station 114.

As the poultry carcass 102 is being transported, carrier car 134 or poultry carcass 102 may pass through multiple predefined positions. For instance, prior to reaching bone blade 116 along the conveyor path 112, poultry carcass 102 may reach and continue past a pretreatment position (e.g., FIGS. 1, 5, and 6) along the transport direction T wherein poultry carcass 102 is held out of engagement with and rearward from bone blade 116, blade carriage 118, or leader bars 152. Further along conveyor path 112, poultry carcass 102 may reach and continue past an intermediate position (e.g., FIGS. 2 and 7) wherein poultry carcass 102 is held immediately rearward from bone blade 116. Still further along conveyor path 112, poultry carcass 102 may reach and continue past a treatment position (e.g., FIGS. 8 and 9) in which bone blade 116 engages (e.g., cuts or grinds against) a segment of keel bone 104, including the tip 104A. After passing the intermediate position, poultry carcass 102 may reach and continue past a posttreatment position (e.g., FIGS. 10 and 11) wherein poultry carcass 102 (or at least the keel bone 104) is held out of engagement with and forward from bone blade 116. Following the posttreatment position and being transported through preharvest station 114, poultry carcass 102 may move to a harvest station or other portion of conveyor line 110 for further processing (e.g., harvesting, peeling, or separating fillets 106 from the rest of poultry carcass 102), as would be understood.

Leader bars 152 may be held against one or both fillets 106 (e.g., between the intermediate position and the posttreatment position). Thus, the method may include holding one or both leader bars 152 against the poultry carcass 102 while the poultry carcass 102 is transported through the preharvest station 114. For instance, the method may include holding a pair of leader bars 152 against joined fillets 106 of the poultry carcass 102 while transporting the poultry carcass 102 through a preharvest station 114. If a pair of biasing arms 158, 160 are provided, as described above, holding the leader bar 152 against the poultry carcass 102 may include compressing one or both biasing arms 158, 160 (e.g., in tandem or independently), such as in the treatment position.

In some embodiments, the method includes detecting the poultry carcass 102 in the treatment position along the conveyor path 112 within the preharvest station 114. In the treatment position, for instance, the blade carriage 118 may engage the carrier car 134, as described above. In certain embodiments, the cam 120 slides on the carrier car 134 (e.g., at the roller wheel 138). Contact between carrier car 134 and cam 120 (e.g., at the high intermediate peak 130) may, in turn, indicate detection of the poultry carcass 102 in the treatment position.

The method may further include directing the bone blade 116 along the guide direction G to a contact position (e.g., FIGS. 1, 2, 7, 8, and 9). For instance, the bone blade 116 may be held at the contact position when poultry carcass 102 is in the pretreatment or intermediate position, as well as the treatment position. Directing the bone blade 116 to the contact position may be based on detecting the poultry carcass 102 in the treatment position. In some such embodiments, movement of the carrier car 134 or poultry carcass 102 along conveyor path 112 (e.g., in the transport direction T) directs the position of blade carriage 118 (and thus bone blade 116) along the guide direction G. As shown, the contact position provides the bone blade 116 inward or proximal to the conveyor path 112 relative to the guide direction G in engagement with the keel bone 104 (e.g., at a common or overlapping level with the tip 104A) while remaining spaced apart from the sternum 108.

While in the contact position, the method may include removing (e.g., cutting or grinding) a segment of the keel bone 104 that includes the tip 104A. For instance, the bone blade 116 may rotate or oscillate as the keel bone 104 is forced to continue moving (i.e., being transported) along the conveyor path 112.

As shown in FIGS. 12 and 13, the treated poultry carcass 102 may advantageously be free of a significant segment of the keel bone 104 (e.g., with improved separation between the joined pairs of fillets 106). Following removal of a segment of the keel bone 104, the method may include detecting the poultry carcass 102 is in a posttreatment position along the conveyor path 112. As shown, the posttreatment position is forward from the treatment position. For instance, the location of the carrier car 134 relative to the cam 120 may shift, which may cause a different portion of the cam 120 to contact or engage the carrier car 134, thereby indicating the poultry carcass 102 is in the posttreatment position.

The method may further include, moving the bone blade 116 along the guide direction G to a post-cut position. For instance, the bone blade 116 may be moved outward (e.g., from the contact position) along the guide direction G to the post-cut position (e.g., FIGS. 9 and 10). Moving the bone blade 116 may be based on detection of the poultry carcass 102 in the posttreatment position. Optionally, moving the bone blade 116 may include pivoting the bone plate about the pivot axis 146, as described above. In the post-cut position, the bone blade 116 may be distal to the conveyor path 112 (as shown) and may avoid engagement (e.g., further cutting or grinding) of a rear portion of the keel bone 104 or poultry carcass 102, generally.

After the bone blade 116 is moved to the post-cut position, the method may include motivating a fluid spray against the bone blade 116 from the blade nozzle 162, as described above. Additionally or alternatively, after the poultry carcass 102 is moved to the posttreatment position, the method may include motivating a fluid spray against the poultry carcass 102 from a blade nozzle 162 forward from the bone blade 116 along the transport direction T, as described above.

Figure 4:
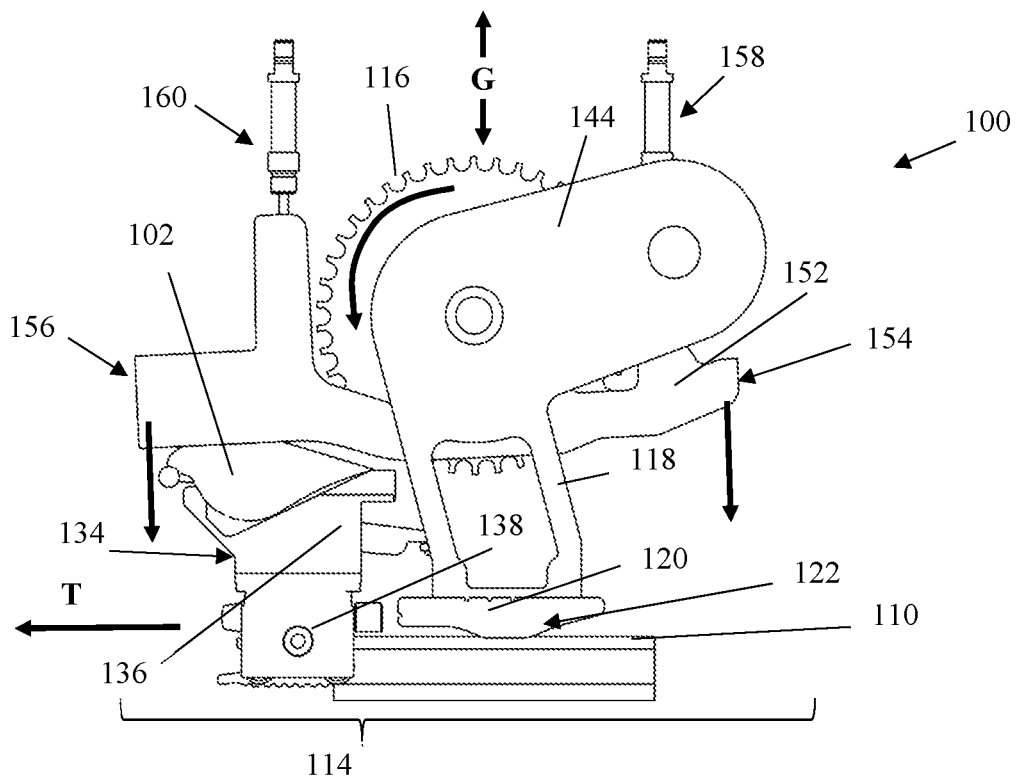
FIG. 4 provides a schematic, lateral perspective view of the exemplary treatment device of FIG. 1, wherein a portion thereof is unengaged subsequent to the poultry carcass being transported through the treatment device.

Following treatment of the poultry carcass 102 or motivation of one or more fluid sprays, the method may include moving the bone blade 116 inward toward the conveyor path (e.g., return bone blade 116 to the contact position), as generally illustrated in FIG. 4. Subsequently, the method may be repeated on a new carcass being transported along conveyor line 110.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A treatment device to remove a portion of a keel bone of a poultry carcass on a conveyor line, the conveyor line defining a conveyor path along a transport direction, the treatment device comprising:
   a blade carriage disposed at a preharvest station on the conveyor path; and
   a bone blade mechanically linked to the blade carriage at the preharvest station to move with the blade carriage, the bone blade being operable to cut or grind a tip of the keel bone, the bone blade being aligned with the keel bone between a pair of fillets of the poultry carcass within the preharvest station, and the bone blade further being spaced apart from a sternum of the poultry carcass.

2. The treatment device of claim 1, further comprising a carrier car comprising a frame supporting the poultry carcass and movable along the conveyor path, and a roller wheel fixed to the frame to move with the frame, the roller wheel being in selective engagement with the blade carriage to motivate movement of the blade carriage along a guide direction apart from the transport direction.

3. The treatment device of claim 1, wherein the blade carriage comprises a cam laterally spaced apart from the conveyor path to move the blade carriage relative to the poultry carcass along a guide direction apart from the transport direction.

4. The treatment device of claim 1, wherein the bone blade comprises a saw blade rotatable about a blade axis, and wherein the blade carriage further comprises a pivot arm extending from a free end defining the blade axis to a fixed end defining a pivot axis about which the free end is pivotable.

5. The treatment device of claim 1, wherein the bone blade is movable along a guide direction between a contact position and a post-cut position, wherein the contact position comprises the bone blade proximal to the conveyor path relative to the guide direction to engage the tip of the keel bone, and wherein the post-cut position comprises the bone blade distal to the conveyor path relative to the guide direction to avoid engagement with a rear portion of the keel bone.

6. The treatment device of claim 5, further comprising a leader bar laterally spaced apart from the bone blade to contact a fillet of the poultry carcass within the preharvest station, the leader bar being supported on a pair of biasing arms independently biased along the guide direction separately from the bone blade, the pair of biasing arms comprising a front biasing arm disposed rearward from the bone blade relative to the transport direction and a rear biasing arm disposed forward from the bone blade relative to the transport direction.

7. The treatment device of claim 1, further comprising a pair of leader bars laterally spaced apart from the bone blade at opposite sides to slidably contact joined fillets of the poultry carcass within the preharvest station.

8. The treatment device of claim 1, further comprising a blade nozzle selectively directed at the bone blade to motivate a fluid spray against the bone blade apart from the poultry carcass.

9. The treatment device of claim 1, further comprising a carcass nozzle selectively directed at a portion of the keel bone to motivate a fluid spray against the poultry carcass forward from the bone blade along the transport direction.

10. A method of treating a poultry carcass on a conveyor line, the conveyor line defining a conveyor path along a transport direction, the method comprising:
   transporting the poultry carcass through a preharvest station on the conveyor path;
   detecting the poultry carcass in a treatment position along the conveyor path within the preharvest station;
   directing a bone blade to a contact position, the contact position providing the bone blade in engagement with a keel bone of the poultry carcass and spaced apart from a sternum of the poultry carcass; and
   removing the tip of the keel bone at the bone blade while in the contact position spaced apart from the sternum.

11. The method of claim 10, further comprising:
   holding a leader bar against a fillet of the poultry carcass while transporting the poultry carcass through a preharvest station, the leader bar being laterally spaced apart from the bone blade.

12. The method of claim 11, wherein the leader bar is supported on a pair of biasing arms independently biased along a guide direction separately from the bone blade, the pair of biasing arms comprising a front biasing arm disposed rearward from the bone blade relative to the transport direction and a rear biasing arm disposed forward from the bone blade relative to the transport direction, and wherein holding the leader bar against the fillet comprises compressing the pair of biasing arms in the treatment position.

13. The method of claim 10, further comprising:
   holding a pair of leader bars against joined fillets of the poultry carcass while transporting the poultry carcass through a preharvest station, the pair of leader bars being laterally spaced apart from the bone blade at opposite sides to slidably contact the joined fillets within the preharvest station.

14. The method of claim 10, wherein transporting the poultry carcass through the preharvest station comprises sliding a carrier car supporting the poultry carcass through the preharvest station, and
   wherein detecting the poultry carcass in the treatment position comprises engaging a blade carriage supporting the bone blade at the carrier car.

15. The method of claim 14, wherein the blade carriage comprises a cam laterally spaced apart from the conveyor path, and wherein engaging the blade carriage comprises sliding the cam on the carrier car.

16. The method of claim 10, wherein directing is based on detecting the poultry carcass in the contact position.

17. The method of claim 10, further comprising:
   detecting the poultry carcass in a posttreatment position along the conveyor path, the posttreatment position being forward from the treatment position; and
   moving, based on detecting the poultry carcass in the posttreatment position, the bone blade along a guide direction to a post-cut position, the post-cut position providing the bone blade distal to the conveyor path relative to the guide direction and contact position to avoid engagement with a rear portion of the keel bone.

18. The method of claim 17, wherein the bone blade comprises a saw blade rotatable about a blade axis, wherein the bone blade is supported on a blade carriage comprising a pivot arm extending from a free end defining the blade axis to a fixed end defining a pivot axis, and wherein moving the bone blade to the post-cut position comprises pivoting the bone blade about the pivot axis on the pivot arm.

19. The method of claim 10, further comprising:
   motivating a fluid spray against the bone blade subsequent to removing the keel bone.

20. The method of claim 10, further comprising:
   motivating a fluid spray against the poultry carcass in a posttreatment position forward from the bone blade along the transport direction.

\* \* \* \* \*